G. W. GARRISON.
EARTH SCRAPER.
APPLICATION FILED MAY 31, 1910.
979,283.
Patented Dec. 20, 1910.
2 SHEETS—SHEET 2.
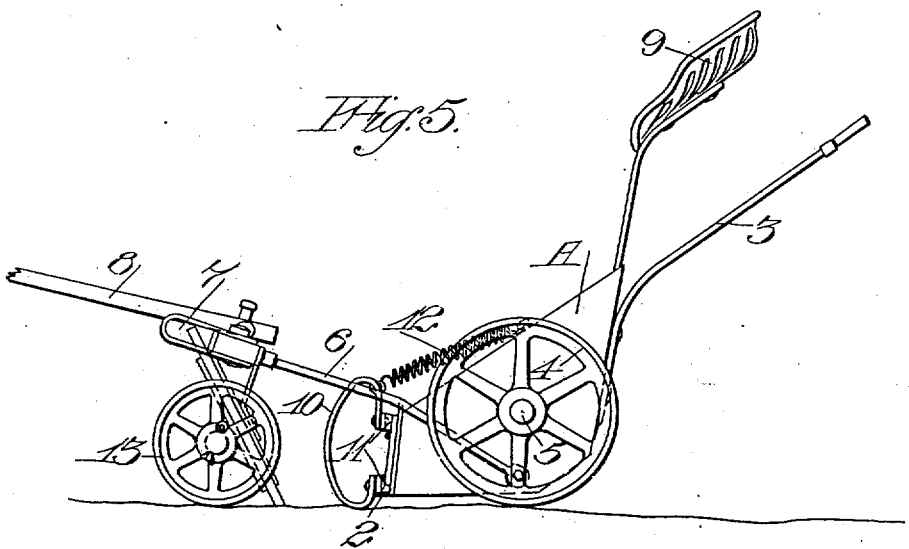
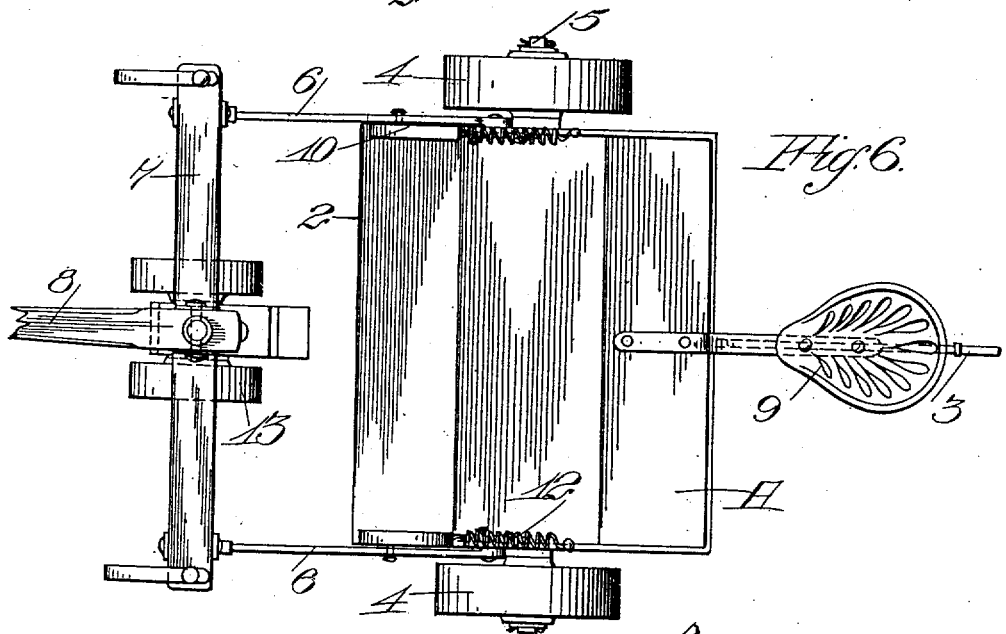
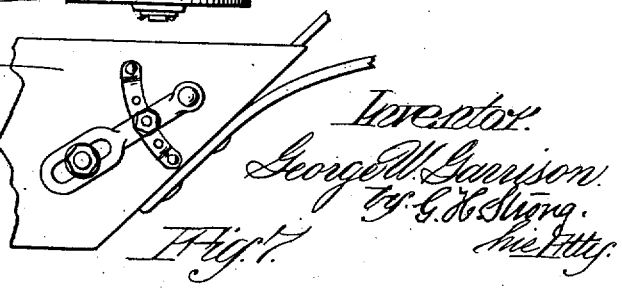
Witnesses.
Thos. Castberg
F. D. Maynard
Inventor.
George W. Garrison
by G. H. Strong.
his Atty.
THE NORRIS PETERS CO., WASHINGTON, D. C.

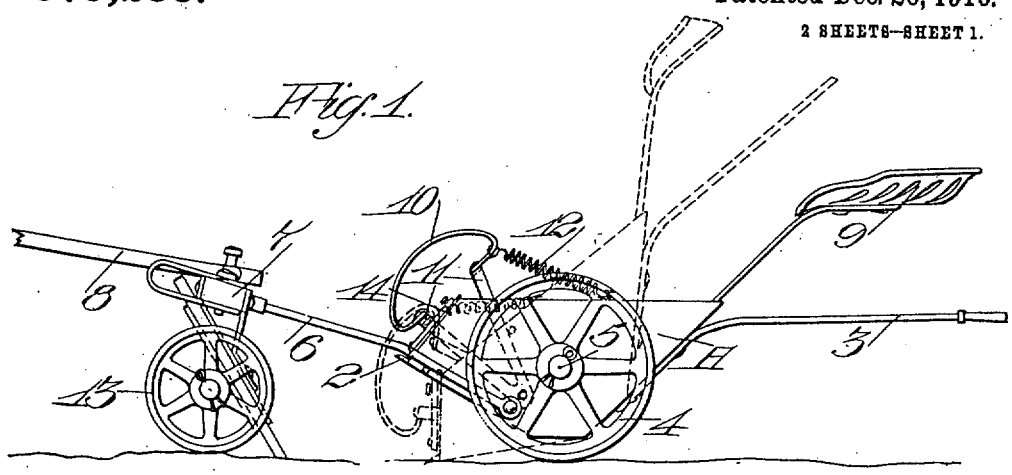
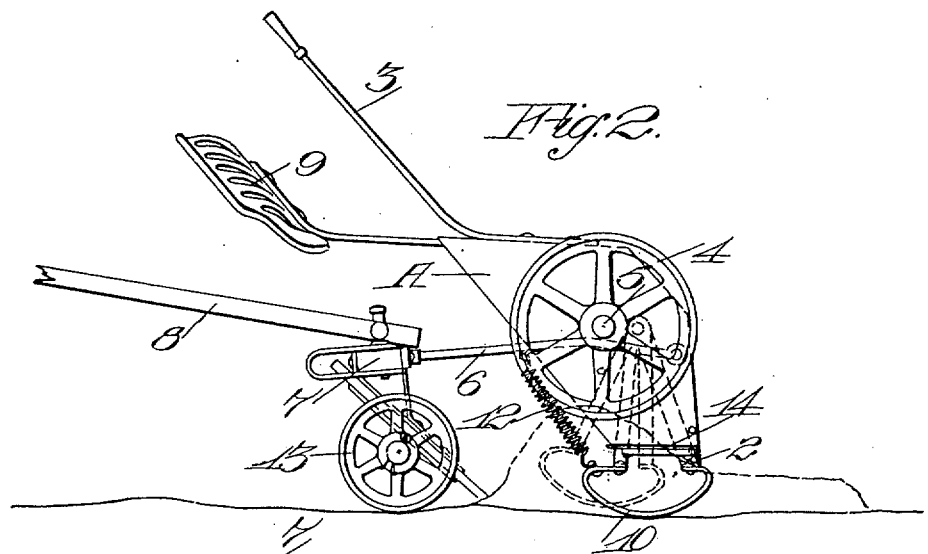
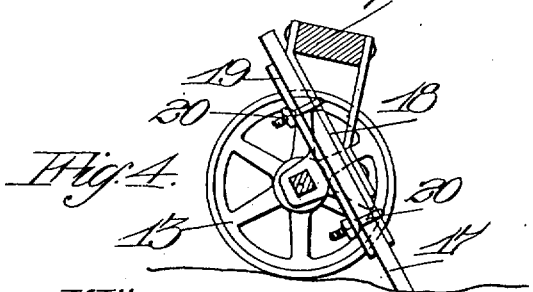
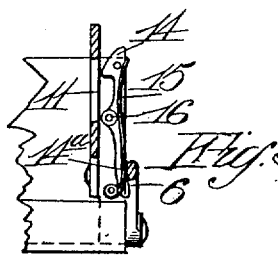

UNITED STATES PATENT OFFICE.

GEORGE W. GARRISON, OF HANFORD, CALIFORNIA.

EARTH-SCRAPER.

979,283. Specification of Letters Patent. Patented Dec. 20, 1910.

Application filed May 31, 1910. Serial No. 564,050.

*To all whom it may concern:*

Be it known that I, GEORGE W. GARRISON, citizen of the United States, residing at Hanford, in the county of Kings and State of California, have invented new and useful Improvements in Earth-Scrapers, of which the following is a specification.

My invention relates to improvements in scrapers especially designed for moving earth and the like.

It consists in the combination of parts and in details of construction which will be more fully explained by reference to the accompanying drawings, in which—

Figure 1 is a side elevation of my scraper in traveling position, showing in dotted lines the excavating position. Fig. 2 is a similar view showing the scraper in dumping position. Fig. 3 is a view of the latch and disengaging means. Fig. 4 is an enlarged detached view of the brake. Fig. 5 is a view of the scraper returning to normal position. Fig. 6 is a plan view. Fig. 7 is a modification showing an axle adjustment.

The scraper consists of a box-like receptacle A, having vertical, parallel sides, and the front edge 2 of the bottom is adapted to excavate the earth or other material and deliver it into the box as the machine is hauled over the ground, and held in proper position by handles 3.

For convenience in manipulating the apparatus, it is mounted upon wheels 4, turnable upon shafts, with journals, as at 5, fixed to each end of the box, and may be adjustable as in Fig. 7.

Draft rods 6 have their rear ends pivoted to the sides of the box in proper position relative to the wheel centers about which the box is tiltable, and the front ends connect with a draft bar 7, to which a team may be attached, either by a pole, as at 8, or by double and swingle trees, or other suitable manner, depending upon the character of the means for hauling the apparatus.

The draft bar is supported upon a plurality of bearing wheels 13, and the brake attachment is carried thereby, which will be more fully hereafter explained.

A seat 9 may be provided for the operator to be used after the scraper has been loaded and returned to a position which will retain its contents, when such contents are to be transported to a considerable distance before being discharged.

10 are convexly curved shoes, having arms 11 extending inwardly along the sides of the scraper box, and having the inner ends pivoted thereto. These shoes have springs 12 connected with them, by which they are normally pulled up above the level of the excavating front 2, and suitable stop pins limit the distance to which they will be raised. These shoes are designed to support the edge of the scraper beyond which they project, as plainly shown, when the scraper is to be dumped, and to raise the front edge of the scraper sufficiently above the ground to insure the complete discharge of its contents, and also to retain the edge thus raised until the scraper is tilted back into the position shown in Fig. 1, so that during this process of returning it to its carrying position the edge of the scraper will not dig up more earth while being thus returned.

The segmental shoes 10 are held in this position by latches 14, which are pivoted to the front edges of the sides of the box and are actuated by springs 15 so that they will engage the arms 11 of the shoes and thus prevent the springs 12 from acting to return the shoes until the latches have been released.

The operation of the scraper, as far as at present described, will then be as follows— The normal position of the scraper being shown in full lines in Fig. 1, when it is desired to load it, a team or other motor being connected and the scraper being hauled along, it is tilted to a position shown in dotted lines in Fig. 1 by means of the handle 3, and in this position the earth will be forced into it by the movement of the team until it is loaded. The scraper may then be dropped back into its normal position, the wheels serving as the fulcrum about which these tilting movements take place. In this position it may be transported to any point where the load is to be discharged. When the point of discharge is reached, the loaded box is tilted about the wheel axles, which form the fulcrum, until the curved segments 10 contact with the ground, and as the apparatus is being steadily hauled along the ground the friction of these segments upon the ground will overcome the tension of the springs 12 and allow the segments to swing backwardly about their pivot points, thus carrying them to the point beneath and to the rear of the edge of the scraper front and the load, and as they project, as before stated, beyond the edge of the scraper, it will be seen that this movement will bodily raise the whole of the scraper and its bearing wheels, and the weight will thus rest upon the curved shoes 10, with the front edge of the scraper box lifted above the surface of the ground. This allows the load to slide out and the scraper to level it as it moves along until, having passed the last portion of the discharge, it will be in condition to be returned to its normal position. This return is effected by pulling backwardly upon the lever, thus returning the box to its normal position.

As the box swings about the wheel axles, the draft or drag rods 6, which are also pivoted to the box, move along the sides of the box until just as the box reaches its normal position these draft rods strike the lower ends of the pawl bars 14ª and tilt them about their fulcrum points 16, until the pawls release the arms 11, and the springs 12 then act to return the segmental shoes to their normal position.

It is a tendency of the machine, under certain conditions, to move forward and run up upon the animals which are drawing it, and in order to prevent this I have shown a brake. This brake consists of a block 17, which may be made of metal, wood or other suitable material, and which is clamped between a shoe 18, carried by the draft bar 7, and a clamping plate 19. This shoe is made adjustable between these plates to extend to a greater or less length below, as desired, and is clamped in the desired position by clamping bolts 20. The lower edge of the shoe is thus in position to drag upon the ground and prevent the scraper from overrunning.

Having thus described my invention, what I claim and desire to secure by Letters-Patent, is—

1. The combination with a wheel scraper including a containing box and a cutting front edge, of convex shoes pivoted to the box and capable of swinging so as to support the edge of the box above the surface of the ground when being returned to the normal position.

2. The combination with a scraper and the receiving box thereof, of convex shoes pivoted to the scraper and projecting to the front thereof, springs and stops by which the shoes are normally held in position, said shoes being movable by frictional contact with the ground to swing back and to raise the edge of the scraper while being returned to the normal position.

3. The combination with a scraper and the receiving box thereof, of convex shoes pivoted to the scraper and projecting to the front thereof, springs and stops by which the shoes are normally held in position, said shoes being movable by frictional contact with the ground to swing back and to raise the edge of the scraper while being returned, and latches by which the shoes are retained in said rearward position.

4. The combination with a scraper and the receiving box thereof, of convex shoes pivoted to the scraper and projecting to the front thereof, springs and stops by which the shoes are normally held in position, said shoes being movable by frictional contact with the ground to swing back and to raise the edge of the scraper while being returned, latches by which the shoes are retained in said rearward position, and draft rods pivoted to the sides of the scraper box adapted to disengage the latches and allow the shoes to return to their normal position.

5. A wheel scraper including an excavating and receiving box, wheels, to the shafts of which the box is fulcrumed, draft rods pivoted to the sides of the box, a draft bar with which the forward ends of said rods are connected, wheels by which said draft bar is supported, and an inclined brake-shoe fixed between said wheels to drag upon the ground.

6. A wheel scraper including an excavating and receiving box, wheels, to the shafts of which the box is fulcrumed, draft rods pivoted to the sides of the box, a draft bar with which the forward ends of said rods are connected, wheels by which said draft bar is supported, an inclined brake-shoe fixed between said wheels to drag upon the ground, and guides between which said shoe is adjustable.

In testimony whereof I have hereunto set my hand in the presence of two subscribing witnesses.

GEORGE W. GARRISON.

Witnesses:
G. H. STRONG,
CHARLES EDELMAN.